United States Patent Office 3,397,121
Patented Aug. 13, 1968

3,397,121
PURIFICATION OF PHTHALIC ANHYDRIDE
Francis A. Fitzgerald, Mountainside, N.J., assignor to Halcon International, Inc., a corporation of Delaware
No Drawing. Filed Oct. 21, 1963, Ser. No. 317,811
15 Claims. (Cl. 203—35)

This invention relates to a method of producing phthalic anhydride with excellent heat stability properties. More specifically, this invention teaches a distillation procedure which is particularly effective for obtaining stable phthalic anhydride from ortho-xylene feedstock.

Phthalic anhydride is an important commercial chemical useful in the manufacture of dyes and resins, and as an intermediate for other chemicals. The color properties of this material are particularly important, especially when the phthalic anhydride is used in the production of alkyd resins, these latter materials being used as coatings in the finishes of automobiles, refrigerators, etc.

In accordance with this invention it has been found that phthalic anhydride having outstanding heat stability characteristics can be obtained by withdrawing and discarding an appropriate "purgecut" at the beginning of the distillation treatment and subsequently removing a defined forecut. The crude phthalic anhydride is initially heat treated with or without sulfuric acid at atmospheric pressures. The mixture is then subjected to distillation and a purgecut removed until the set point of the material is over 110° C. The set point is determined in accordance with ASTM Method D-1493-57T. The pressure at this stage of the distillation is then reduced to generally between atmospheric and 75 mm. Hg. Higher and lower pressures may be employed, but they are generally not economical. A pressure of about 80 to 120 mm. is most preferred at a reflux ratio of between 60:1 and 30:1, most desirably approximately 40:1. The purgecut is continued until a set point of 110° C. to 128° C., preferably 115° C. to 125° C., achieved.

Following removal of the purgecut, the "forecut" is removed by continuing the distillation until the distillate has a hazen color stability from about 0 to 20, preferably from 10 to 15. The heat stability color test employed is No. L-48 described in Phthalic Anhydride, Allied Chemical Corp., 1961, p. 66. The pressure at which the forecut is taken is generally the same as that indicated for the purgecut. The reflux ratio of 40:1 to 20:1, preferably about 30:1, is conventionally employed. Preferably, this forecut is recycled to the treating step, or to the batch following the treating step.

The purified product is now taken overhead and conventionally referred to as "heartcut." The pressure limitations in this step are essentially the same as in the previous steps, a reflux ratio of between 5:1 and 0.8:1 preferably about 1:1 being employed. The heartcut distillation is discontinued when the boil up decreases or when the material goes off specification.

Finally, as a preferred embodiment a "backcut" may be removed. This backcut is obtained by stripping the material through the column without any reflux whatever. Generally this material is also recycled along with the forecut.

Conventionally, the sulfuric acid heat treatment and the distillations are carried out in one vessel in a batchwise manner. However, those skilled in the art can readily adapt the process to a continuous operation wherein different vessels are employed for each of the treating distillation steps.

To more fully illustrate the invention the following examples are given:

EXAMPLE 1

A reactor effluent from the oxidation of ortho-xylene is condensed in a switch condenser. When a significant pressure drop in the condenser occurs, the flow of the reactor effluent is discontinued and the condenser heated by a circulating fluid. The phthalic anhydride in the condenser is liquified and withdrawn. The liquid obtained is passed to a distillation column and 0.5% of sulfuric acid is added. The liquid is heated to 280 to 285° C. and held at atmospheric pressure for four to eight hours at reflux. A purge cut is removed at 40:1 reflux ratio during the treating. The pressure in the column is then reduced to 100 mm. Hg and the purgecut withdrawal overhead is continued. This purgecut constitutes about 1½ to 3% of the crude phthalic anhydride charged to the process and is taken at a reflux ratio of 40:1. All of the purgecut is discarded. The purge is discontinued when the overhead material has a set point of about 120° C. Maintaining the same pressure, a forecut is withdrawn at a reflux ratio of 30:1 until the heat stability of two successive samples is equivalent to a hazen color of 20 or lower.

The reflux is then altered to 1:1 and the heartcut withdrawn. This heartcut constitutes approximately 93% of the crude phthalic anhydride charged. It is continued until the overhead goes off specification or the boil up rate can no longer be maintained. Finally, a backcut is obtained with no reflux. This step constitutes merely a stripping operation and the material obtained is recycled along with the forecut to the next run. These two recycle streams contain approximately 12 to 17% of the total charged. A residue of 1.5 to 4% is left in the distillation system. The heat stability of the heartcut obtained from this distillation has a hazen color of about 15 and is essentially unchanged by time.

EXAMPLE 2

The procedure of Example 1 is repeated except that no purgecut is discarded, i.e., the entire forecut is recycled. The heartcut obtained initially has a hazen color of 45 and after forty-eight hours the hazen color changes to 70. This comparison clearly shows the necessity of discarding the purgecut in order to maintain high heat stability.

It will be understood that modifications and variations may be affected without departing from the spirit of the invention.

I claim:

1. A process for the purification of crude phthalic anhydride which comprises: heat treating crude phthalic anhydride obtained from the oxidation of ortho-xylene at atmospheric pressure for 4 to 8 hours while withdrawing a purgecut, continuing the heat treating under reduced pressure between atmospheric and 75 mm. Hg and continuing to remove the purgecut until a distillate has a set point of from 110° C. to 128° C., withdrawing a forecut under reduced pressure until a distillate has a hazen color of 20 or below, and withdrawing a distillate of phthalic anhydride.

2. The process of claim 1 wherein the phthalic anhydride is initially treated with sulfuric acid.

3. A process according to claim 1 wherein the heat treating is continued until the distillate has a set point of 115° C. to 125° C.

4. A process according to claim 1 wherein the hazen color is below 15.

5. A process according to claim 1 wherein the reduced pressure is from about 80 to 120 mm. Hg.

6. A process according to claim 5 wherein the heat treating is continued until the distillate has a set point of 115° C. to 125° C.

7. A process according to claim 5 wherein the hazen color is below 15.

8. A process according to claim 6 wherein the hazen color is below 15.

9. A process according to claim 1 wherein the initial heat treating is carried out in the presence of sulfuric acid.

10. A process according to claim 9 wherein the heat treating is continued until the distillate has a set point of 115° C. to 125° C.

11. A process according to claim 9 wherein the hazen color is below 15.

12. A process according to claim 9 wherein the reduced pressure is from about 80 to 120 mm. Hg.

13. A process according to claim 12 wherein the heat treating is continued until the distillate has a set point of 115° C. to 125° C.

14. A process according to claim 12 wherein the hazen color is below 15.

15. A process according to claim 13 wherein the hazen color is below 15.

References Cited

UNITED STATES PATENTS

| | | | |
|---|---|---|---|
| 2,671,054 | 3/1954 | Bump et al. | 260—346.7 |
| 1,817,304 | 8/1931 | Foster | 260—346.7 |
| 2,662,901 | 12/1953 | Bailey | 260—346.7 |
| 1,897,110 | 2/1933 | Bowers | 260—346.7 |

OTHER REFERENCES

Phthalic Anhydride, Allied Chemical Corp. (1961), pp. 62–64 and 66–67.

HENRY R. JILES, *Primary Examiner.*